US011762578B2

(12) United States Patent
Li et al.

(10) Patent No.: US 11,762,578 B2
(45) Date of Patent: Sep. 19, 2023

(54) BUFFER POOL CONTENTION OPTIMIZATION

(71) Applicant: International Business Machines Corporation, Armonk, NY (US)

(72) Inventors: Shuo Li, Beijing (CN); Xiaobo Wang, Beijing (CN); Sheng Yan Sun, Beijing (CN); Hong Mei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 17/036,897

(22) Filed: Sep. 29, 2020

(65) Prior Publication Data

US 2022/0100417 A1 Mar. 31, 2022

(51) Int. Cl.
*G06F 3/06* (2006.01)

(52) U.S. Cl.
CPC .......... *G06F 3/0656* (2013.01); *G06F 3/0604* (2013.01); *G06F 3/0679* (2013.01)

(58) Field of Classification Search
USPC ........................................................ 711/154
See application file for complete search history.

(56) References Cited

U.S. PATENT DOCUMENTS

| 5,440,692 | A  | * | 8/1995 | Janicek | ................... | G06F 5/065 |
|           |    |   |        |         |                     | 711/171    |
| 9,563,361 | B1 | * | 2/2017 | Aslot   | ..................... | G06F 3/0613 |
| 11,036,412| B2 | * | 6/2021 | Khalili | ..................... | G06F 3/064 |

| 2004/0168035 | A1 | * | 8/2004 | Romanufa | ............ | G06F 12/126 |
|              |    |   |        |          |              | 711/E12.075 |
| 2011/0219169 | A1 | * | 9/2011 | Zhang    | ..................... | G06F 3/061 |
|              |    |   |        |          |              | 711/159 |
| 2012/0310998 | A1 | * | 12/2012 | Burka   | ................. | G06F 9/45504 |
|              |    |   |        |          |              | 707/813 |
| 2015/0169237 | A1 | * | 6/2015 | Ioannou  | ............. | G06F 12/0246 |
|              |    |   |        |          |              | 711/103 |
| 2016/0170649 | A1 | * | 6/2016 | Ramesh   | ................ | G06F 3/0608 |
|              |    |   |        |          |              | 711/165 |
| 2017/0090755 | A1 | * | 3/2017 | Sun      | ....................... | G06F 3/0656 |
| 2017/0185645 | A1 |   | 6/2017 | Agarwal  |              |  |
| 2017/0220477 | A1 |   | 8/2017 | Wang     |              |  |
| 2018/0253467 | A1 |   | 9/2018 | Gurajada |              |  |
| 2020/0251158 | A1 | * | 8/2020 | Shore    | ..................... | G11C 11/407 |

FOREIGN PATENT DOCUMENTS

| CN | 104899154 | A  | * | 9/2015 |         |            |
| CN | 110737410 | A  |   | 1/2020 |         |            |
| CN | 110888600 | B  | * | 2/2021 | ............. | G06F 3/061 |
| KR | 100570731 | B1 | * | 4/2006 |         |            |
| WO | WO-2018141304 | A1 | * | 8/2018 | ......... | G06F 12/0868 |

OTHER PUBLICATIONS

Translated Wu et al. (CN110888600B) (Year: 2020).*

* cited by examiner

*Primary Examiner* — Sanjiv Shah
*Assistant Examiner* — Elias Young Kim
(74) *Attorney, Agent, or Firm* — Gavin Giraud (57) ABSTRACT

A computer-implemented method that includes managing a buffer pool of pages into a ring sub-chain comprising pages linked in a ring, and a linear sub-chain comprising pages linked in a line from a header, and moving a page between the linear sub-chain and the ring sub-chain based on a moving schema evaluating a chain management characteristic.

18 Claims, 5 Drawing Sheets

BUFFER POOL CONTENTION OPTIMIZATION

BACKGROUND

The present invention relates generally to the field of computer storage management, and more particularly to managing pages within a buffer pool to reduce the time at which the pages are latched.

Computer systems and databases store information in a variety of ways to balance the needs of quick access and large storage capacity. For example, databases may maintain a limited supply of information in a buffer pool of frequently or recently used pages that are likely to be accessed again. The pages stored in the buffer pool are more quickly accessed by a processor unit such that future requests for the pages by the processor unit can be served faster from the buffer pool than when pages are requested from other slower memory.

The computer systems maintain the buffer pool using a chain that replaces less recently, or less frequently, used or accessed pages with pages that are currently being used or accessed. The database may organize the pages in a linked list between a header and a tail according to the needs for that database. As different pages are accessed, the database latches and reorganizes the linked list. Latching the buffer pool halts access to any page in the buffer pool.

SUMMARY

According to one embodiment of the present invention, a computer-implemented method includes managing a buffer pool of pages into a ring sub-chain comprising pages linked in a ring, and a linear sub-chain comprising pages linked in a line from a header, and moving a page between the linear sub-chain and the ring sub-chain based on a moving schema evaluating a chain management characteristic.

The method of may include tracking a frequency count, a modification status, and a use status, for each of the pages. The frequency count of a first page may be incremented subsequent to the first page being accessed. The method may include changing the modification status subsequent to the first page being modified, and changing the modification status subsequent to the first page is written to a non-volatile memory. The method may include changing the use value of a first page from unflagged to flagged when the first page is accessed.

The method may include determining a replaceable page by sequentially evaluating each page within the ring sub-chain. The method may also include replacing the replaceable page with a replacement page from outside of the buffer pool. Evaluating each page within the ring sub-chain may include determining that a modification value is flagged for a current page. Evaluating may also include, responsive to determining that the modification value is flagged, determining that the current page is not the replaceable page and evaluating a next page as the current page.

Additionally or in the alternative, evaluating each page within the ring sub-chain may include determining that a use value is unflagged for a current page, determining that a frequency count is less than a threshold value, and, responsive to determining that the use value is flagged and the frequency count is less than the threshold value, determining that the current page is the replaceable page. Evaluating each page within the ring sub-chain may include determining that a frequency count for the current page is greater than a threshold value, responsive to determining that a frequency count for the current page is greater than a threshold value, determining that the current page is not the replaceable page, reducing the frequency count for the current page, and evaluating a next page as the current page.

The method may include tracking a ring sub-chain count ("RC") of pages within the ring sub-chain that satisfy a condition of the moving schema, and a linear sub-chain count ("LC") of pages within the linear sub-chain that satisfy a condition of the moving schema, wherein the moving schema is activated when the RC reaches a RC threshold or when the LC reaches a LC threshold.

The moving schema of the method may include a latching moving schema and a slide window moving schema, which are selected based on a busy level of the buffer pool. Additionally or in the alternative, the latching moving schema may include latching the buffer pool, moving all pages in the linear sub-chain with an unflagged use value and frequency count less than a threshold to the ring sub-chain, moving all pages in the ring sub-chain with a flagged use value and a flagged modification value to the linear sub-chain, moving all pages in the ring sub-chain with a flagged use value and a frequency count higher than a threshold to the linear sub-chain, and unlatching the buffer pool.

The slide window moving schema may include latching a slide window of pages in the linear sub-chain that have an unflagged use value and a frequency count less than a threshold, moving the slide window to the linear sub-chain, unlatching the slide window, latching a second slide window of pages in the ring sub-chain with a flagged use value and a selection from the group consisting of: a flagged modification value and a frequency count higher than a threshold, moving the second slide window to the ring sub-chain, and unlatching the second slide window.

According to another embodiment, a computer program product is provided. The computer program product may include one or more computer readable storage media, and program instructions collectively stored on the one or more computer readable storage media, the program instructions comprising: managing a buffer pool of pages into a ring sub-chain comprising pages linked in a ring, and a linear sub-chain comprising pages linked in a line from a header, moving a page between the linear sub-chain and the ring sub-chain based on a moving schema evaluating a chain management characteristic.

According to another embodiment, a computer system is provided. The computer system may include one or more computer processors, one or more computer readable storage media, and program instructions collectively stored on the one or more computer readable storage media for execution by at least one of the one or more computer processors. The program instructions may include managing a buffer pool of pages into a ring sub-chain comprising pages linked in a ring, and a linear sub-chain comprising pages linked in a line from a header, and moving a page between the linear sub-chain and the ring sub-chain based on a moving schema evaluating a chain management characteristic.

DETAILED DESCRIPTION

Embodiments of the present invention address latching in a buffer pool when pages are reordered. To reduce latching, a chain manager manages the buffer pool into a ring sub-chain and a linear sub-chain. As pages are used, they are added and replaced within the buffer pool, and changed from one sub-chain to the other. Once the pages are in the buffer pool, however, the pages can be accessed without latching the buffer pool and reordering the pages. Also, replacing and changing pages between sub-chains can be accomplished without latching the entire chain. Furthermore, the chain manager described in the embodiments below takes frequency of page access and recency of page access into account when maintaining the buffer pool. The chain manager, therefore, keeps a frequently used page in the buffer pool, even if it may not have been accessed recently, which improves access to the frequently used page.

Figure 1:
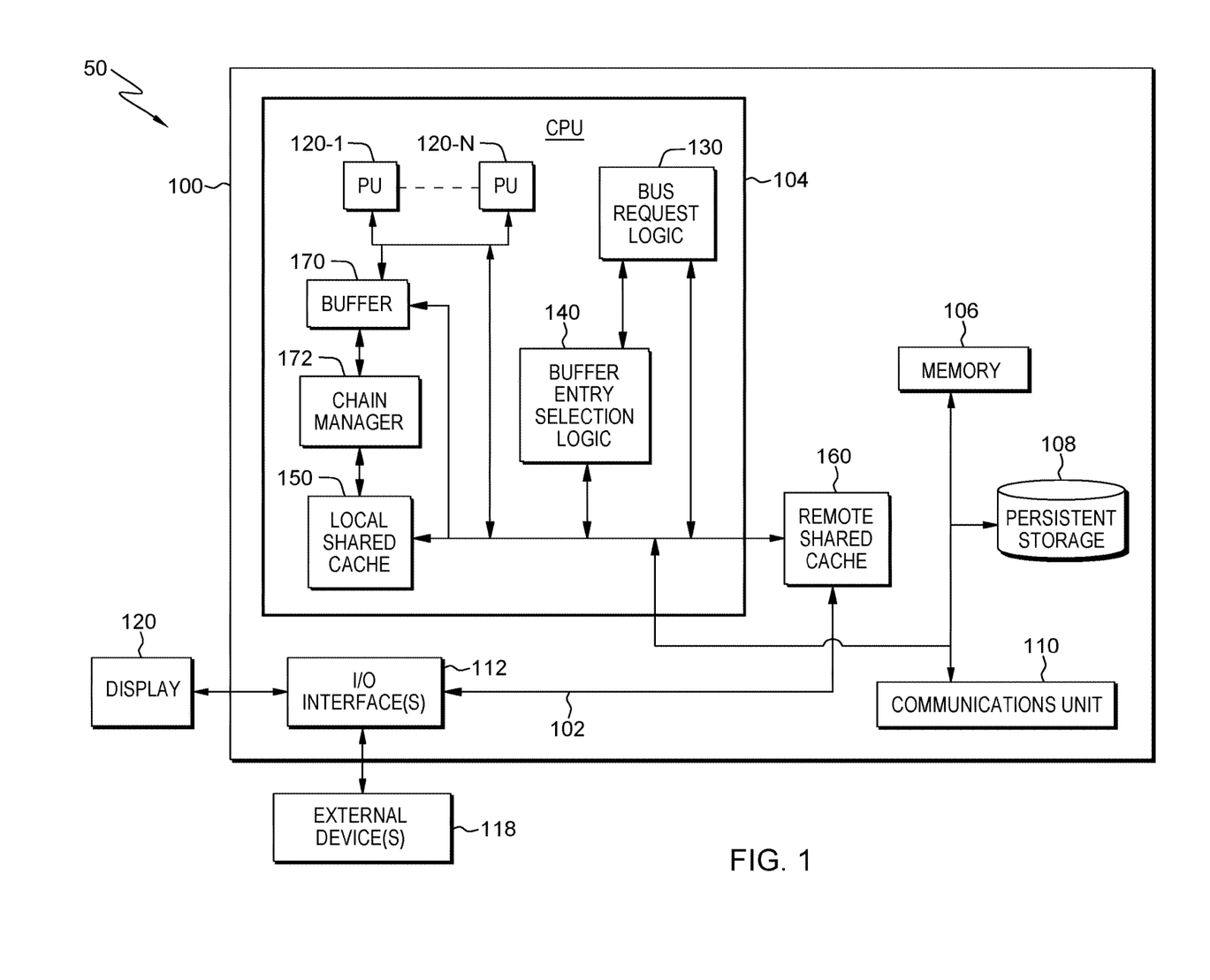
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 50, and components of a computing device 100, in accordance with an illustrative embodiment of the present invention. It should be appreciated that FIG. 1 provides only an illustration of one implementation and does not imply any limitations regarding the environments in which different embodiments may be implemented. Many modifications to the depicted environment may be made.

Computing device 100 may be a management server, a web server, or any other electronic device or computing system capable of receiving and sending data, and processing program instructions. In some embodiments, computing device 100 may be a laptop computer, tablet computer, netbook computer, personal computer (PC), a desktop computer, a smart phone, or any programmable electronic device.

Computing device 100 includes bus 102, which provides communications between processing units (PUs) 120-1 through 120-N, a bus request logic 130, a buffer entry selection logic 140, a local shared cache 150, a remote shared cache 160, a buffer pool 170, a memory 106, a persistent storage 108, a communications unit 110, and an input/output (I/O) interface(s) 112. The bus 102 can be implemented with any architecture designed for passing data and/or control information between processors (such as microprocessors, communications and network processors, etc.), system memory, peripheral devices, and any other hardware components within a system. The bus 102 can be implemented with, for example, one or more buses or a crossbar switch. In general, the bus 102 is a communications fabric.

The CPU 104 may be a multi-core processor including PUs 120-1 through 120-N. A multi-core processor is a single computing component with two or more independent actual CPUs (e.g., PU 120-1 through PU 120-N), which are the processing units that read and execute program instructions. The CPU includes PUs 120-1 through 120-N, buffer pool 170, local shared cache 150, bus request logic 130, and buffer entry selection logic 140.

PUs 120-1 through 120-N may each be an individual processor located on the CPU 104. In general, PUs 120-1 through 120-N share existing communication fabric, such as the bus 102, within the computing device 100 and the data processing environment 10. In some embodiments, multiple instances of the bus 102 may be used within the CPU 104, shared by a subset of the total number of PUs 120-1 through 120-N on the CPU 104. The PUs 120-1 through 120-N may each request data from one or more data sources, such as, for example, the local shared cache 150, the remote shared cache 160, the memory 106, or the persistent storage 108. Each PU of PUs 120-1 through 120-N may also have additional levels of cache (e.g. L1, L2) located on-chip that are not shared among the PUs 120-1 through 120-N, and rather are exclusively accessible and usable by individual PUs of PUs 120-1 through 120-N. In embodiments of the present invention, there may be any number of PUs 120, as indicated by the annotation PU 120-1 through PU 120-N. In general, two or more PUs 120 may exist within the CPU 104. As used herein, PU 120 refers to any single PU of PUs 120-1 through 120-N.

The memory 106 and the persistent storage 108 are computer readable storage media. In this embodiment, the memory 106 includes random access memory (RAM). In general, the memory 106 can include any suitable volatile or non-volatile computer readable storage media. In general, data stored to the memory 106 may, responsive to a request from a PU of PUs 120-1 through 120-N, be routed to the buffer pool 170, or directly to the bus 102 (e.g., a first portion of data sources from the memory 106 may be routed directly to the bus 102, while each additional portion of data from the data stream is written to the buffer pool 170), based on the bus request logic 130 and/or the buffer entry selection logic 140.

The local shared cache 150 is a fast memory, located on the same integrated circuit die or single chip package as PUs 120-1 through 120-N (e.g., CPU 104), that enhances the performance of the CPU 104 by holding recently and/or frequently accessed data, and data near accessed data, from the memory 106. The local shared cache 150 may be, for example, local L3 cache. In general, data stored to the local shared cache 150 may, responsive to a request from a PU of PUs 120-1 through 120-N, be routed to the buffer pool 170, or directly to the bus 102, based on the bus request logic 130 and/or the buffer entry selection logic 140.

The remote shared cache 160 is a fast memory, located off-chip from PUs 120-1 through 120-N (e.g., a location not on the CPU 104), that enhances the performance of the CPU 104 by holding recently accessed data, and data near accessed data, from the memory 106. The remote shared cache 160 may be, for example, remote L3 cache, L4 cache, or other off-chip caches. In general, data stored to the remote shared cache 150 may, responsive to a request from a PU of PUs 120-1 through 120-N, be routed to the buffer pool 170, or directly to the bus 102, based on the bus request logic 130 and/or the buffer entry selection logic 140.

The buffer pool 170 is a physical register file located in the on-chip data flow hardware and is used to temporarily store data while it is being moved from one place to another.

The buffer pool 170 may act as a buffer when sending data to the PU 120 from the persistent storage 108, the memory 106, the remote shared cache 160, or the local shared cache 150. In general, the buffer pool 170 queues data requesting access to the bus 102 until the bus request logic 130 and/or the buffer entry selection logic 140 causes the data to be sent to the bus 102.

The buffer entry selection logic 140 operates to receive requests to pass data on a shared bus (e.g., bus 102) and identify the location of the data, whether the data should be sent on the bus 102, or whether the data should be temporarily held within the buffer pool 170. The buffer entry selection logic 140, along with the bus request logic 130, also operates to select data written to the buffer pool 170 to send on the bus 102. The buffer entry selection logic 140 is communicatively connected to the buffer pool 170. In the depicted embodiment, the buffer entry selection logic 140 is logic located on the CPU 104. In other embodiments, the buffer entry selection logic 140 may reside elsewhere, provided the buffer entry selection logic 140 is communicatively connected to the bus 102.

While the data is held in the buffer pool 170, the buffer entry selection logic 140 and the bus request logic 130 cooperate with a chain manager 172 to ease contention on the buffer pool 170 as the CPU requests data from pages within the buffer pool 170. Writing pages to and from the buffer pool 170 can contribute to high occurrences of latching, since maintaining the buffer pool 170 (e.g., ordering pages within the buffer pool 170) can, in certain embodiments, include latching the entire buffer pool 170. Latching the buffer pool 170 prevents processes from simultaneously updating any page that is currently stored in the buffer pool 170, which is useful in some instances where pages could be corrupted, but can also slow down access to pages that are not simultaneously being requested. The chain manager 172 manages the buffer pool 170 into a linear sub-chain and a ring sub-chain so that latching can be reduced. That is, rather than maintaining and reordering the buffer pool 170 with every request for access to a page (requiring latching of the buffer pool 170), the chain manager 170 tracks the frequency and recency of one or more of the pages, and/or moves the pages between the linear sub-chain and the ring sub-chain, and replaces the pages with pages from the local shared cache 150, the remote shared cache 160, the memory 160, or the persistent storage 108, while focusing on reducing contention as explained in detail below.

The bus request logic 130 performs operations that select data entries written to the buffer pool 170 to be sent on to the bus 102. In general, the bus request logic 130 prioritizes particular data requests based on factors that include, for example, whether any data has been returned, whether only one data portion has been returned, or whether two consecutive data portions of a data stream have already been written to the buffer pool 170 and are ready to be returned via the bus 102 to the target PU of PUs 120-1 through 120-N.

Programs may be stored in the persistent storage 108 and in the memory 106 for execution by one or more of the respective CPUs 104 via the local shared cache 150 and/or the remote shared cache 160. In an embodiment, the persistent storage 108 includes a magnetic hard disk drive. Alternatively, or in addition to a magnetic hard disk drive, the persistent storage 108 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 108 may also be removable. For example, a removable hard drive may be used for the persistent storage 108. Other examples include optical and magnetic disks, thumb drives, and smart cards that are inserted into a drive for transfer onto another computer readable storage medium that is also part of the persistent storage 108.

The communications unit 110, in these examples, provides for communications with other data processing systems or devices. In these examples, the communications unit 110 includes one or more network interface cards. The communications unit 110 may provide communications using either or both physical and wireless communications links. Programs may be downloaded to the persistent storage 108 through the communications unit 110.

The I/O interface(s) 112 allows for input and output of data with other devices that may be connected to the computing device 100. For example, the I/O interface 112 may provide a connection to external device(s) 118 such as a keyboard, keypad, a touch screen, and/or some other suitable input device. The external device(s) 118 can also include portable computer readable storage media such as, for example, thumb drives, portable optical or magnetic disks, and memory cards. Software and data can be stored on such portable computer readable storage media and can be loaded onto the persistent storage 108 via the I/O interface(s) 112. The I/O interface(s) 112 also connect to a display 190. The display 120 provides a mechanism to display data to a user and may be, for example, a computer monitor.

Figure 2:
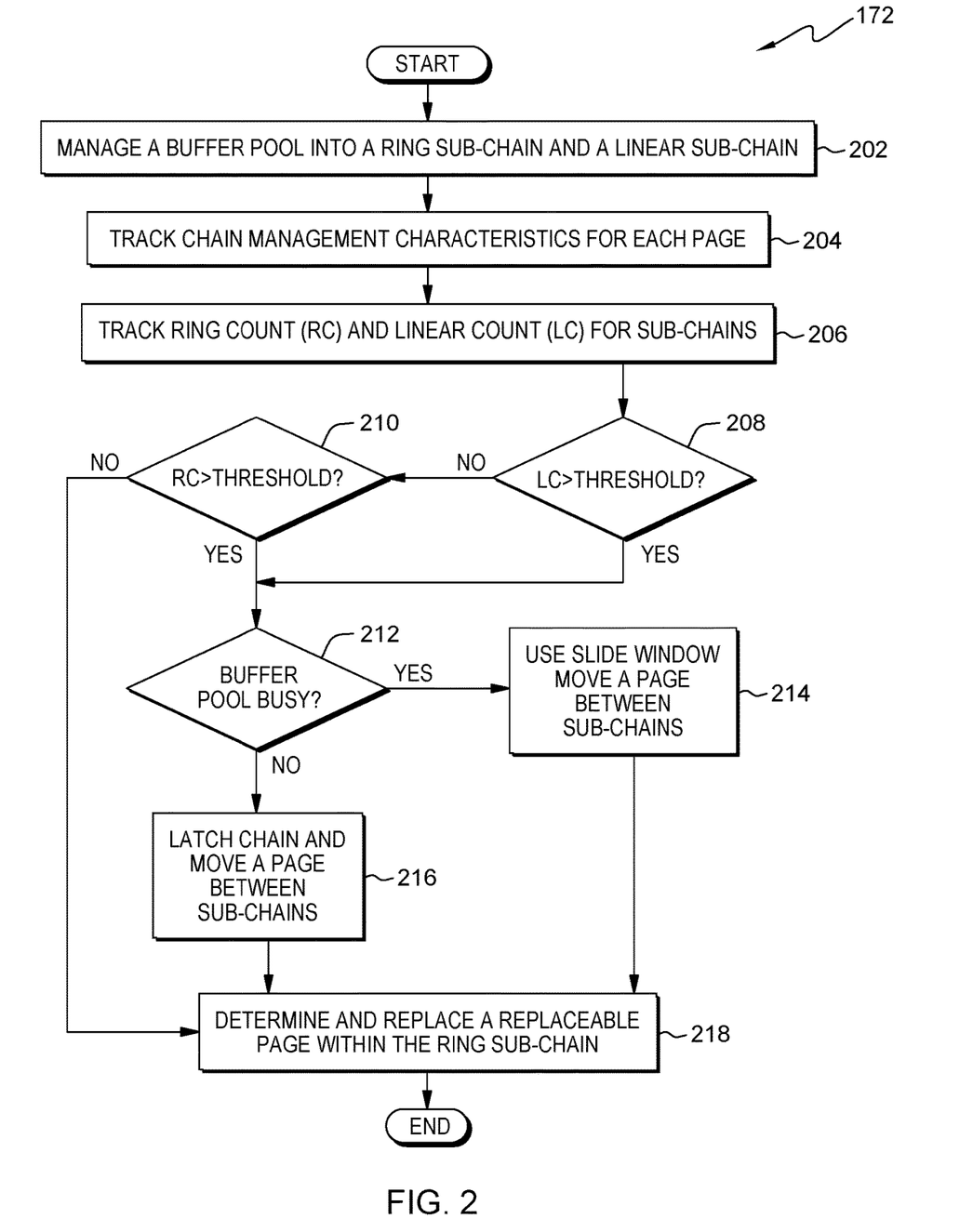
FIG. 2 is a flowchart depicting operational steps of a chain manager on a computer within the data processing environment of FIG. 1.

FIG. 2 is a flowchart depicting operational steps of a chain manager logic, executing within the computing environment 50 of FIG. 1, in accordance with an embodiment of the present invention. The chain manager 172, along with the buffer 170, the bus request logic 130, and the buffer entry selection logic 140, operates to queue pages within the buffer 170 and enable the most recent and the most frequently used pages to remain in the buffer pool with a reduced amount of latching.

The chain manager 172 increases access to pages within the buffer pool 170 by reducing contention caused when the pages are latched. Rather than leaving maintenance of the buffer pool 170 to merely reordering the chain after every operation or request by the CPU 104 (i.e., PUs 120-1 to 120-N), the chain manager 172 centralizes the management of the chain such that several operations may be performed on multiple pages before requiring any latch of the buffer pool 170. The chain manager 172 may begin managing the buffer pool 170 when the buffer pool 170 is empty or may begin managing when the buffer pool 170 has pages. To manage the buffer pool 170, the chain manager 172 manages (e.g., organizes, orders, and/or divides) the pages into a ring sub-chain and a linear sub-chain (block 202). In certain embodiments, the linear chain keeps recently and frequently referenced or changed pages, and the ring chain keeps pages that are not frequently or recently referenced. Examples of tracking recency or frequency of the pages are described in this description, but embodiments of the invention cover any variety or combination of tracking access and/or use of the pages. Pages enter and exit the buffer pool 172 (i.e., pages are replaced with new replacement pages) primarily through the ring sub-chain, while certain embodiments could include pages entering directly into the linear sub-chain.

To manage, replace, and move the pages of the buffer pool 170, the chain manager 172 tracks chain management characteristics for each page so that frequency, recency, and modification may all be considered (block 204). For example, the chain manager 172 tracks a frequency count ("F") of a page that increments subsequent to the page being accessed. The F may go up by one for a page whenever that page is accessed, but in certain embodiments the increment amount may vary depending on a type of access (e.g., access requested by a specific application may count twice as much while other applications do not). The F may include a maximum value above which further access will not increment the F. A maximum F value can reduce a workload on the chain manager 172 when a page is accessed several times over a short period of time. As a page can be accessed hundreds of times, the maximum F value means that the chain manager 172 is free to ignore access requests over the maximum. The F may go down with operation of the chain manager 172 (as explained below) or through the expiration of a timer.

Modification of the pages within the environment 50 is tracked by the chain manager 172 as a modification status ("M") of each page. When a page is modified, the M changes to "flagged" (e.g., yes, 1, etc.), which enables the chain manager 172 to treat the page differently until the modification of the page have been written to the memory 106 and/or the persistent storage 108. Subsequent to the page being written to the memory 106 and/or the persistent storage 108, the flagged value of the M for the page returns to unflagged (e.g., no, 0, etc.).

The chain manager 172 also takes recency into account by tracking a use status ("U") for each page. The U, like the M, is either flagged or unflagged. The U changes to flagged when the page is requested for access. The U changes to unflagged at the expiration of a timer (which may be the same timer as the F), or through the operation of the chain manager 172. The timer(s) for the F or the U may each be customized to the preferences of a user. The chain manager 172 may use a combination of the tracked values (i.e., F, M, U) to determine which pages to move between the linear sub-chain and the ring sub-chain, and which pages from the ring sub-chain to replace with replacement pages.

To determine when to move pages between the sub-chains, the chain manager 172 also tracks a ring count ("RC") for the ring sub-chain and a linear count ("LC") for the linear sub-chain. The RC is a measure of the number of pages in the ring sub-chain that have tracked values (i.e., F, M, U) indicating that the page is "hotter" and thus should be moved to the linear sub-chain. The LC is a measure of the number of pages in the linear sub-chain that have tracked values (i.e., F, M, U) indicating that the page is "colder" and thus should be moved to the ring sub-chain. The hotness or coldness of the tracked values may be customized by a user.

For example, in certain embodiments the chain manager 172 may be programmed with: a frequency count maximum of "3;" a RC of pages having a F greater than or equal to "2" and a flagged U, or a flagged M; and a LC of pages having a F less than 2 and an unflagged U. The chain manager 172 may also be programmed with a RC threshold ("RCT") and a LC threshold ("LCT"). If the chain manager 172 determines that the LC is greater than the LCT (block 208 "Yes"), then the chain manager 172 initiates a moving schema. If the LC is less than the LCT (block 208 "No"), then the chain manager 172 determines whether the RC is greater than the RCT (block 210). If the RC is less than the RCT (block 210 "No"), then the chain manager 172 skips the moving schema, and proceeds to other operations (e.g., block 218). If the RC is greater than the RCT (block 210 "Yes"), then the chain manager 172 initiates a moving schema.

The chain manager 172, in certain embodiments, determines whether the buffer pool 170 is busy (block 212). The chain manager 172 can determine whether the status is busy by checking the concurrent page access thread number. If the concurrent page access number is bigger than a threshold which can be set by a user, the chain manager 172 will determine the buffer pool has a busy status. If the chain manager 172 determines that the buffer pool 170 is not busy (block 212 "No", bottom) then the chain manager 172 latches the buffer pool and moves the appropriate pages to the appropriate sub-chain (block 216). That is, the linear sub-chain and the ring sub-chain are latched, and then the hotter pages from the ring sub-chain are moved to the linear sub-chain, and/or the colder pages from the linear sub-chain are moved to the ring sub-chain. After the pages are moved, the chain manager 172 unlatches the linear sub-chain and the ring sub-chain.

If the chain manager 172 determines that the buffer pool 170 is busy (block 212 "Yes", right), then the chain manager 172 uses a slide window to latch a small group (e.g., hotter pages within the ring sub-chain) from one sub-chain and move them to the other sub-chain. This is explained in more detail in the discussion regarding FIGS. 4-6.

At any time during operation, including after performing the moving schema, the chain manager 172 can determine and replace a replaceable page from the ring sub-chain (block 218). The chain manager 172 sequentially evaluates each page within the ring sub-chain to determine a replaceable page that is sufficiently "cold" (i.e., a page that has not been used frequently and/or recently) When chain manager 172 finds the cold page and determines that it is replaceable, then it is removed from the ring sub-chain (while still located elsewhere in the environment 10) and a replacement page is added to the ring-sub chain. The replacement page may be a page that has recently been accessed (i.e., F=1 and U=1), or may be a page that has been modified (i.e., M=1, F=1, U=1). The chain manager 172 then ends the operation.

Figure 3:
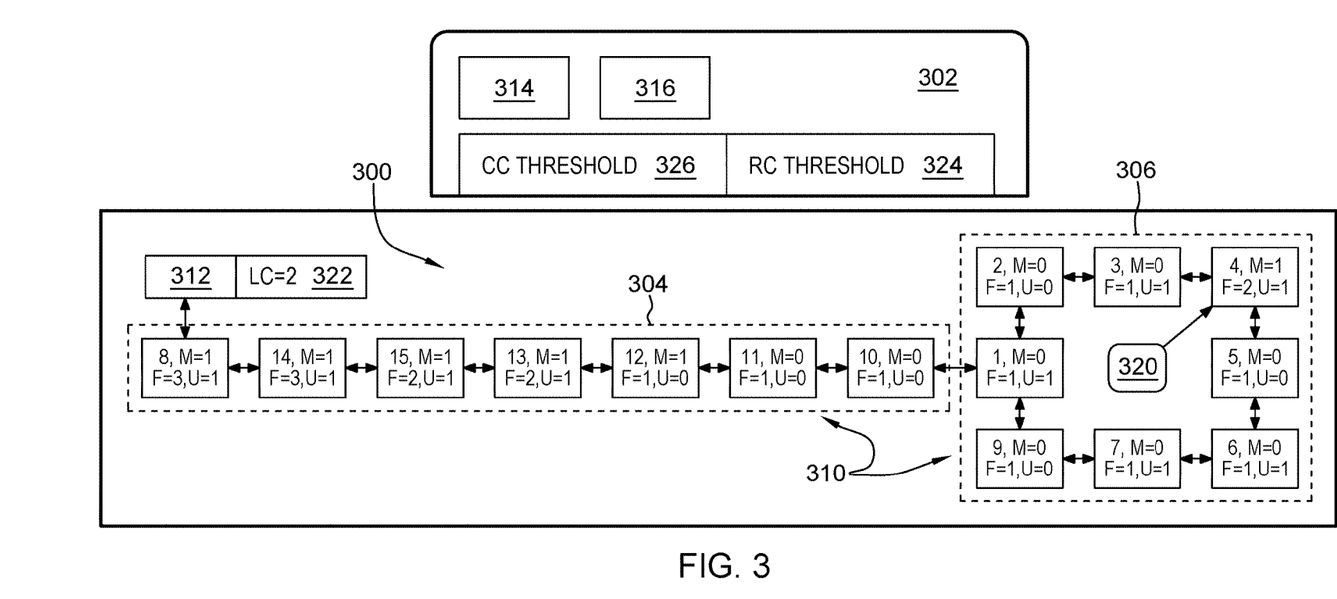
FIG. 3 is a schematic representation of a buffer pool being managed by a chain manager, in accordance with an illustrative embodiment of the present invention.

FIG. 3 is a schematic representation of a buffer pool 300 being managed by a chain manager 302, in accordance with an illustrative embodiment of the present invention. The chain manager 302 manages the buffer pool 300 into a linear sub-chain 304 and a ring sub-chain 306. When the chain manager 302 first populates the buffer pool 300, each page 310 is added first to the ring sub-chain 306. When the ring sub-chain is filled to a maximum, then additional pages 310 are added to the linear sub-chain until it is filled to its maximum. FIG. 3 shows eight pages in the ring sub-chain 306 and seven pages in the linear sub-chain 304, but the maximums for the sub-chains 304, 306 may be customized to include fewer or many more pages. The linear sub-chain 304 attaches pages 310 in a line between a head 312 and the ring sub-chain 306, but page 310 in the ring sub-chain 306 is attached to two other pages 310 in a closed ring. When a page 310 is added, it is populated with chain management characteristics: a frequency count F, a modification status M, and a use status U, as described above. For new pages 310: F=1, U=1, and M=0. With further database activity, the buffer pool 300 may have pages 310 with the chain management characteristics indicated in FIG. 3.

The chain manager 302 tracks the chain management characteristics as described above and includes a timer 314 to adjust the F and U each time it expires. With a diversity of chain management characteristics certain embodiments organize the linear sub-chain 304 from hotter pages 310 at the head 312 and the colder pages 310 away from the head 312. This organization, however, is not required since movement between the sub-chains 304, 306 may occur for pages 310 at any location within the linear sub-chain 304. To determine activation of the moving schema, the chain manager 302 tracks the flagged status of the M and U and compares F to a frequency threshold ("FT") 316. Pages 310 with flagged status and F greater than or equal to the threshold are determined to belong in the linear sub-chain 304. If these pages 310 are in the ring sub-chain 306, the chain manager 302 adds to the ring count ("RC") 320. Contrariwise, pages 310 with unflagged M and U, and F lower than FT are counted as a linear count ("LC") 322 if the pages 310 are located within the linear sub-chain 304. The FT 316 may be customized based on user preference, but in the illustrated embodiment the FT 316 is 2. Thus, evaluation of the chain management characteristics shows that the RC is 1 (i.e., page number 4) and the LC is 2 (i.e., page number 10 and page number 11).

As discussed above with respect to blocks 208 and 210, the chain manager 302 compares the RC 320 to an RCT 324 and the LC 322 to an LCT 326 to determine whether to start the moving schema. If the LCT 326 is 1 in the illustrated embodiment of FIG. 3, for example, the chain manager 302 would proceed with a moving schema and would select either the slide window schema or the latching schema. In the latching schema, the buffer pool 300 is latched from the head 312 all through all of the ring sub-chain 306. Then all the all pages with U=1 and (M=1 or F≥FT) are moved to the head 312 of linear sub-chain 304, and pages in the linear sub-chain 304 with U=0 and F<FT are moved to the ring sub-chain 306. Then the buffer pool 300 is unlatched.

Figure 4:
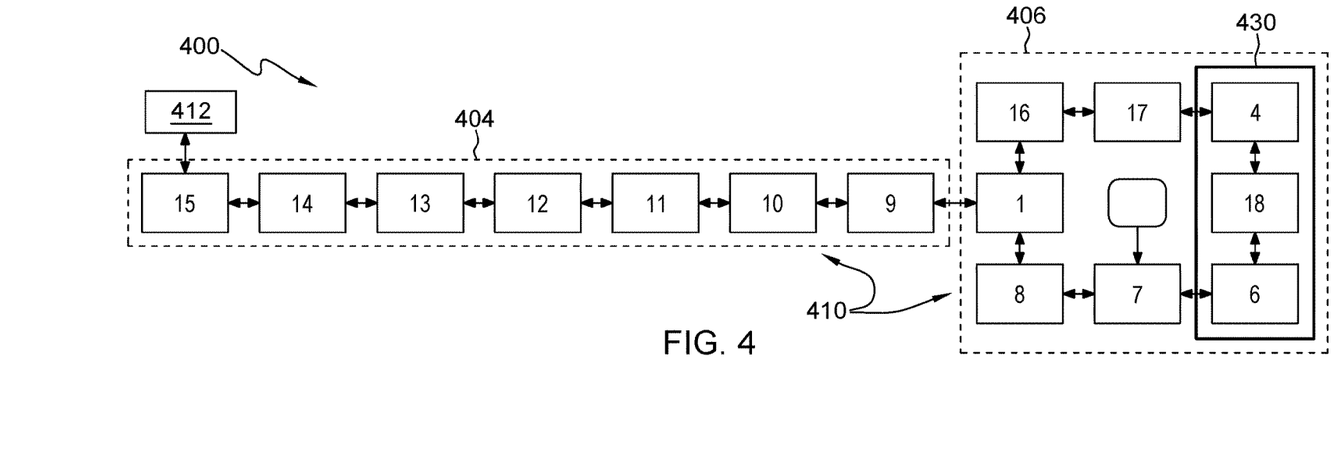
FIG. 4 depicts a schematic representation of a buffer pool with a linear sub-chain and a ring sub-chain.
Figure 5:
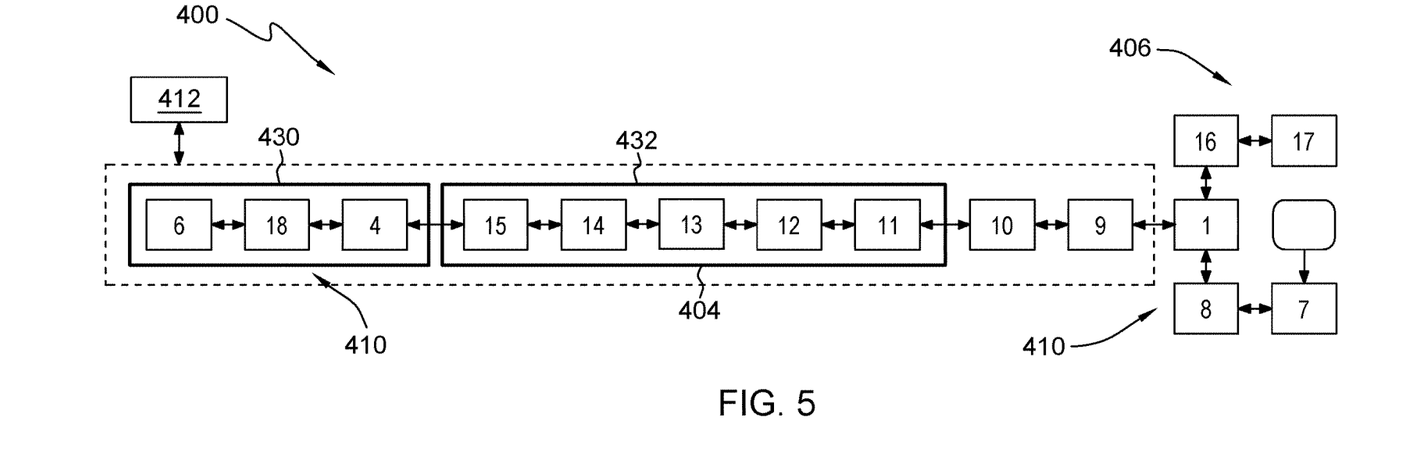
FIG. 5 depicts a schematic representation of the buffer pool of FIG. 4 partially completed with the operation of a slide window moving schema.
Figure 6:
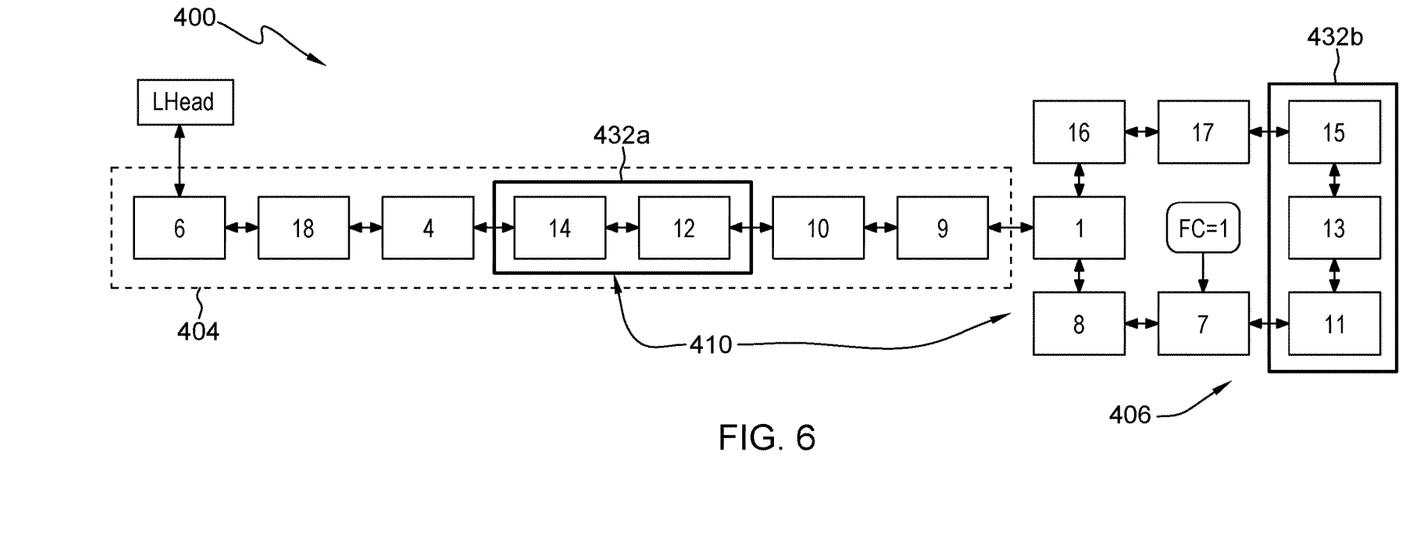
FIG. 6 depicts a schematic representation of the buffer pool of FIGS. 4 and 5.

The slide window moving schema is illustrated in FIGS. 4-6. FIG. 4 depicts a schematic representation of a buffer pool 400 with a linear sub-chain 404 and a ring sub-chain 406. For simplicity the chain management characteristics have been hidden. For the slide window moving schema, a first slide window 430 is created around a group of pages 410 by finding a first page 410 that fits the moving criteria, then successively checking each neighboring page to see if it also needs to move. The ring sub-chain 406 has three pages (i.e., one of page 4, 18, or 6) that need to be moved to a head 412 of the linear sub-chain 404, therefore the first slide window 430 is bounded around these pages 410. When both neighboring pages (e.g., page numbers 17 and 7 in FIG. 4) do not need to be moved, the window boundaries are set and the pages 410 in the first slide window 430 are latched to prevent contention. Since only the pages 410 in the first slide window 430 are latched, the remaining pages 410 in the buffer pool 400 are available for access without contention. The first slide window 430 is then moved to the head 412, as represented in FIG. 5.

FIG. 5 depicts a schematic representation of the buffer pool 400 of FIG. 4 partially completed with the operation of a slide window moving schema. The first slide window 430 is placed at the head 412 of the buffer pool 400, and the pages 410 (i.e., pages 6, 18, and 4) are ready to be unlatched. After the first slide window 430 is unlatched, a second slide window 432 is formed around pages 410 in the linear sub-chain 404. The slide windows used in this moving schema do not have to include only pages 410 that will be moved. The second slide window 432, for example, includes pages 14 and 12 that do have chain management characteristics that fit the criteria of the linear sub-chain 404. Since these pages (i.e., 14 and 12) are surrounded by pages that will be moved (i.e., pages 15, 13, and 11), the chain manager (e.g., chain manager 172, chain manager 302) latches all five pages together to facilitate moving pages 15, 13, and 11 without contention. The result of this movement is shown in FIG. 6.

FIG. 6 depicts a schematic representation of the buffer pool 400 of FIGS. 4 and 5. The second slide window 432 has split into two windows 432a, 432b so that the pages 410 can be attached within the designated sub-chain. The first sub window 432a keeps pages 14 and 12 in the linear sub-chain 404, and the second sub window 432b moves pages 15, 13, and 11 into the ring sub-chain 406. When the moving is complete, the sub windows 432a, 432b are disbanded and the pages 410 are unlatched. The pages 410 of the buffer pool 400 are all ready to be accessed. The slide window moving schema thus reduces latch time, while still managing the buffer pool 400 with the appropriate pages being prioritized for continued access. In fact, there are several pages 410 that never have to be latched at all. Specifically, pages 10, 9, 16, 17, 1, 8, and 7 are all never latched throughout the slide window moving schema.

Figure 7:
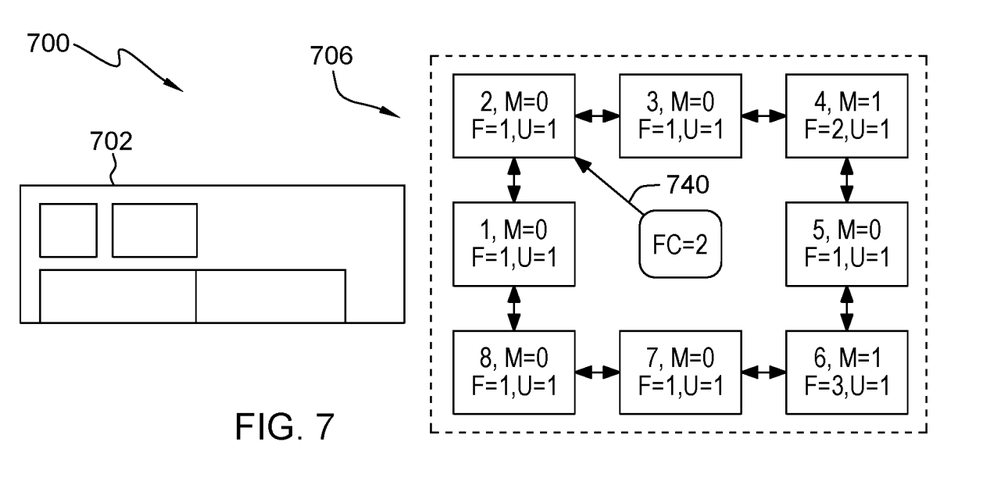
FIGS. 7-9 are schematic representations of a ring sub-chain of a buffer pool that may be used within the computing environment of FIG. 1, in accordance with an embodiment of the present invention.

FIG. 7 is a schematic representation of a ring sub-chain 706 of a buffer pool that may be used within the computing environment 50 of FIG. 1, in accordance with an embodiment of the present invention. A chain manager 702 receives a request to replace three new replacement pages within the buffer pool 700, and the chain manager 702 begins sequentially evaluating each page within the ring sub-chain 706. The chain manager 702 may use a number of techniques to sequentially evaluate each page. In the illustrated embodiment (shown in progress in FIGS. 7-9), for example, the sequential evaluation is represented by a ring pointer 740. The ring pointer 740 points at a current page and the chain manager 702 determines whether the current page is a replaceable page. To determine the replaceable page, the chain manager 702 cycles through a series of conditions, if the condition is not satisfied, the chain manager 702 looks for the next condition. First condition: M=1. If M=1, the chain manager 702 determines the current page is not a replaceable page, and skips to a new page, which becomes the current page. Second condition: U=0 and F<FT. If both are true, then the current page is replaceable and the chain manager 702 replaces the current page. Third condition: U=0, F≥FT. If both are true, then the chain manager reduces F, and skips to a new current page without replacing. F may be reduced by a customized amount, a default reduction being 1. Fourth condition: U=1, F<FT. If both are true, the chain manager 702 sets U=0, and skips to a new current page without replacing. Fifth condition: U=1, F≥FT. If both are true, the chain manager skips to a new current page without replacing.

Figure 8:
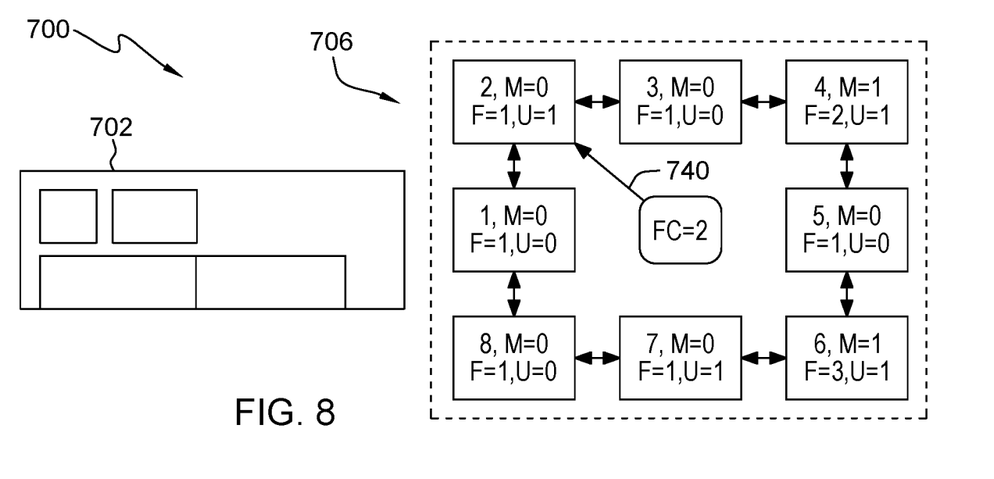
Figure 9:
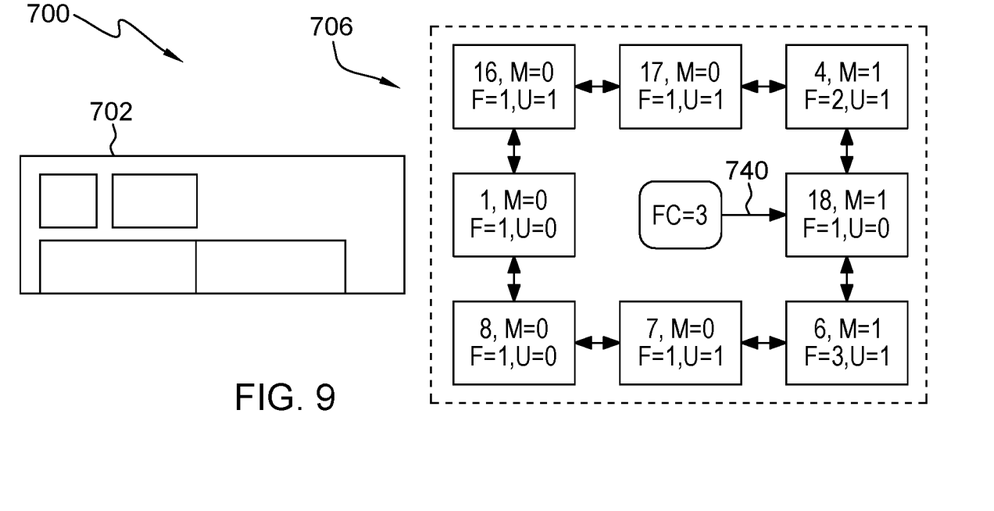

Of the five conditions, only the second condition results in a page being replaced. Other conditions, however, change F or U to create the second condition on a subsequent evaluation indicated by the ring pointer 740. In FIG. 7, for example, none of the pages satisfy the second condition and therefore they are not replaced when indicated by the ring pointer 740. FIG. 8 is a schematic representation of the ring sub-chain 706 of FIG. 7, except that the chain manager 702 has evaluated each page for the conditions. Pages 4 and 6, for example, satisfied the first condition and were skipped. The remainder of the pages (i.e., 2, 3, 5, 7, 8, and 1) satisfied the fourth condition so U was set to 0, but the pages were not replaced. The ring pointer 740 is therefore indicating page 2, again, but U for some pages has changed. The chain manager 702 then continues again around the ring sub-chain 704. This time, however, several pages satisfy the second condition for replacement. FIG. 9 is a schematic representation of the ring sub-chain 706 of FIGS. 7 and 8 after the chain manager 702 has continued evaluating each page for the conditions. This continued evaluation results in the chain manager 702 replacing pages 2, 3, and 5 with new replacement pages 16, 17, and 18, respectively. As the new pages are populated in the ring sub-chain 704, F and U are set to 1. Furthermore, if the page has been modified, as is the case for page 18, M is also set to 1.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    managing, with a chain manager, a buffer pool of pages into a ring sub-chain comprising pages linked in a ring, and a linear sub-chain comprising pages linked in a line from a header, wherein the pages of the ring sub-chain and the pages of the linear sub-chain are configured to be written to and written from; and
    moving a page between the linear sub-chain and the ring sub-chain based on a moving schema evaluating a chain management characteristic for the page, wherein the moving schema comprises:
        a latching moving schema comprising latching the buffer pool, wherein latching prevents processes from simultaneously updating the pages that are currently stored in the buffer pool; and
        a slide window moving schema, wherein selecting between the latching moving schema and the slide window moving schema is based on a busy level of the buffer pool, and wherein the slide window moving schema comprises:
            latching a slide window of pages in the linear sub-chain that have an unflagged use value and a frequency count less than a threshold without preventing processes from simultaneously updating the pages outside the slide window;
            moving the slide window to the ring sub-chain;
            unlatching the slide window after moving the slide window to the linear sub-chain;
            latching a second slide window of pages in the ring sub-chain;
            moving the second slide window to the linear sub-chain; and
            unlatching the second slide window after moving the second slide window to the ring sub-chain.

2. The method of claim 1, comprising tracking a frequency count, a modification status, and a use status, for each of the pages.

3. The method of claim 2, comprising incrementing the frequency count of a page of the buffer pool of pages subsequent to the page being accessed.

4. The method of claim 2, comprising:
    changing the modification status subsequent to the first page being modified; and
    changing the modification status subsequent to the first page being written to a non-volatile memory.

5. The method of claim 2, comprising changing the use value of a first page from unflagged to flagged when the first page is accessed.

6. The method of claim 1, comprising:
    determining a replaceable page by sequentially evaluating each page within the ring sub-chain; and
    replacing the replaceable page with a replacement page from outside of the buffer pool.

7. The method of claim 6, wherein evaluating each page within the ring sub-chain comprises:
    determining that a modification value is flagged for a current page; and
    responsive to determining that the modification value is flagged, determining that the current page is not the replaceable page and evaluating a next page as the current page.

8. The method of claim 6, wherein evaluating each page within the ring sub-chain comprises:
    determining that a use value is unflagged for a current page;
    determining that a frequency count is less than a threshold value; and
    responsive to determining that the use value is flagged and the frequency count is less than the threshold value, determining that the current page is the replaceable page.

9. The method of claim 6, wherein evaluating each page within the ring sub-chain comprises:
    determining that a frequency count for the current page is greater than a threshold value;
    responsive to determining that a frequency count for the current page is greater than a threshold value, determining that the current page is not the replaceable page, reducing the frequency count for the current page, unflagging a flagged use value, and evaluating a next page as the current page.

10. The method of claim 1, comprising tracking a ring sub-chain count ("RC") of pages within the ring sub-chain that satisfy a condition of the moving schema, and a linear sub-chain count ("LC") of pages within the linear sub-chain that satisfy a condition of the moving schema, wherein the moving schema is activated when the RC reaches a RC threshold or when the LC reaches a LC threshold.

11. The method of claim 1, wherein the latching moving schema comprises:
    moving all pages in the linear sub-chain with an unflagged use value and frequency count less than a threshold to the ring sub-chain;
    moving all pages in the ring sub-chain with a flagged use value and a flagged modification value to the linear sub-chain;
    moving all pages in the ring sub-chain with a flagged use value and a frequency count higher than a threshold to the linear sub-chain; and
    unlatching the buffer pool after moving pages to a selection from the group consisting of: the ring sub-chain or to the linear sub-chain.

12. A computer program product comprising:
    one or more computer readable storage media, and program instructions collectively stored on the one or more computer readable storage media, the program instructions comprising:
        managing a buffer pool of pages into a ring sub-chain comprising pages linked in a ring, and a linear sub-chain comprising pages linked in a line from a header, wherein the pages of the ring sub-chain and the pages of the linear sub-chain are configured to be written to and written from;
        moving a page between the linear sub-chain and the ring sub-chain based on a moving schema evaluating a chain management characteristic for the page, wherein the moving schema comprises:
  a latching moving schema comprising latching the buffer pool, wherein latching prevents processes from simultaneously updating the pages that are currently stored in the buffer pool; and
  a slide window moving schema, wherein selecting between the latching moving schema and the slide window moving schema is based on a busy level of the buffer pool, and wherein the slide window moving schema comprises:
    latching a slide window of pages in the linear sub-chain that have an unflagged use value and a frequency count less than a threshold without preventing processes from simultaneously updating the pages outside the slide window;
    moving the slide window to the ring sub-chain;
    unlatching the slide window after moving the slide window to the linear sub-chain;
    latching a second slide window of pages in the ring sub-chain;
    moving the second slide window to the linear sub-chain; and
    unlatching the second slide window after moving the second slide window to the ring sub-chain.

13. The computer program product of claim 12, wherein the program instructions comprise:
  tracking a frequency count, a modification status, and a use status, for each of the pages;
  incrementing the frequency count of a first page subsequent to the first page being accessed;
  changing the modification status subsequent to the first page being modified; and
  changing the modification status subsequent to the first page is written to a non-volatile memory; and
  changing the use value of a first page from unflagged to flagged when the first page is accessed.

14. The computer program product of claim 12, comprising:
  determining a replaceable page by sequentially evaluating each page within the ring sub-chain; and
  replacing the replaceable page with a replacement page from outside of the buffer pool.

15. The computer program product of claim 14, wherein evaluating each page within the ring sub-chain comprises:
  determining that a modification value is flagged for a current page; and
  responsive to determining that the modification value is flagged, determining that the current page is not the replaceable page and evaluating a next page as the current page;
  determining that a use value is unflagged for a current page;
  determining that a frequency count is less than a threshold value; and
  responsive to determining that the use value is flagged, and the frequency count is less than the threshold value, determining that the current page is the replaceable page.

16. The computer program product of claim 14, wherein evaluating each page within the ring sub-chain comprises:
  determining that a frequency count for the current page is greater than a threshold value;
  responsive to determining that a frequency count for the current page is greater than a threshold value, determining that the current page is not the replaceable page, reducing the frequency count for the current page, and evaluating a next page as the current page.

17. The computer program product of claim 12, comprising tracking a ring sub-chain count ("RC") of pages within the ring sub-chain that satisfy a condition of the moving schema, and a linear sub-chain count ("LC") of pages within the linear sub-chain that satisfy a condition of the moving schema, wherein the moving schema is activated when the RC reaches a RC threshold or when the LC reaches a LC threshold.

18. A computer system comprising:
  one or more computer processors, one or more computer readable storage media, and program instructions collectively stored on the one or more computer readable storage media for execution by at least one of the one or more computer processors, the program instructions comprising:
    managing a buffer pool of pages into a ring sub-chain comprising pages linked in a ring, and a linear sub-chain comprising pages linked in a line from a header, wherein the pages of the ring sub-chain and the pages of the linear sub-chain are configured to be written to and written from; and
    moving a page between the linear sub-chain and the ring sub-chain based on a moving schema evaluating a chain management characteristic for the page, wherein the moving schema comprises:
      a latching moving schema comprising latching the buffer pool, wherein latching prevents processes from simultaneously updating the pages that are currently stored in the buffer pool; and
      a slide window moving schema, wherein selecting between the latching moving schema and the slide window moving schema is based on a busy level of the buffer pool, and wherein the slide window moving schema comprises:
        latching a slide window of pages in the linear sub-chain that have an unflagged use value and a frequency count less than a threshold without preventing processes from simultaneously updating the pages outside the slide window;
        moving the slide window to the ring sub-chain;
        unlatching the slide window after moving the slide window to the linear sub-chain;
        latching a second slide window of pages in the ring sub-chain;
        moving the second slide window to the linear sub-chain; and
        unlatching the second slide window after moving the second slide window to the ring sub-chain.

* * * * *